United States Patent [19]
Akebi et al.

[11] Patent Number: 5,825,342
[45] Date of Patent: Oct. 20, 1998

[54] LIQUID CRYSTAL DISPLAY AND PROJECTOR EMPLOYING THE SAME

[75] Inventors: Yasunobu Akebi, Yamabe-gun; Masumi Kubo; Toshihiro Yamashita, both of Nara, all of Japan

[73] Assignee: Sharp Kabushiki Kaisha, Osaka, Japan

[21] Appl. No.: 501,775

[22] Filed: Jul. 13, 1995

[30] Foreign Application Priority Data

Jul. 13, 1994 [JP] Japan .................................. 6-161127

[51] Int. Cl.⁶ ...................................................... G09G 3/36
[52] U.S. Cl. .............................................. 345/87; 345/100
[58] Field of Search ............................... 345/87, 98, 100, 345/88, 204, 205, 208; 348/744, 751, 190, 792

[56] References Cited

FOREIGN PATENT DOCUMENTS

| | | |
|---|---|---|
| 3539236 | 5/1987 | Germany . |
| 4313139 | 11/1993 | Germany . |
| 3-289697 | 12/1991 | Japan . |
| 4-322242 | 11/1992 | Japan . |
| 19726 | 1/1993 | Japan . |

*Primary Examiner*—Regina Liang
*Attorney, Agent, or Firm*—David G. Conlin; William J. Daley, Jr.

[57] ABSTRACT

A liquid crystal display, employed in a projector, including a liquid crystal panel using, for example, a TN liquid crystal, having visual angle characteristics that the direction of a visual angle in which the contrast reaches its maximum does not match with the direction of the normal line, and transmitting incident light from an opposing substrate side while modulating the same. The liquid crystal panel can reverse the sides and the top and bottom of an image by reversing the orders of image signal application to the signal lines and scanning signal application to the scanning lines, respectively. Signal input units are formed at two opposing ends of the liquid crystal panel and a mounting means for mounting the liquid crystal display to the projector is formed point symmetry with respect to the center of the liquid crystal panel. As a result, the projector can use the liquid crystal displays of one type in common when images formed by the liquid crystal displays must be reversed left to right and/or upside down with respect to each other.

11 Claims, 8 Drawing Sheets

LIQUID CRYSTAL DISPLAY AND PROJECTOR EMPLOYING THE SAME

FIELD OF THE INVENTION

The present invention relates to a liquid crystal display serving as a good light bulb of a projector, and to a projector employing such a liquid crystal display.

BACKGROUND OF THE INVENTION

A liquid crystal display with a liquid crystal panel, which has become popular as a flat panel display in recent years, can also serve as a light bulb of a projector.

Figure 4:
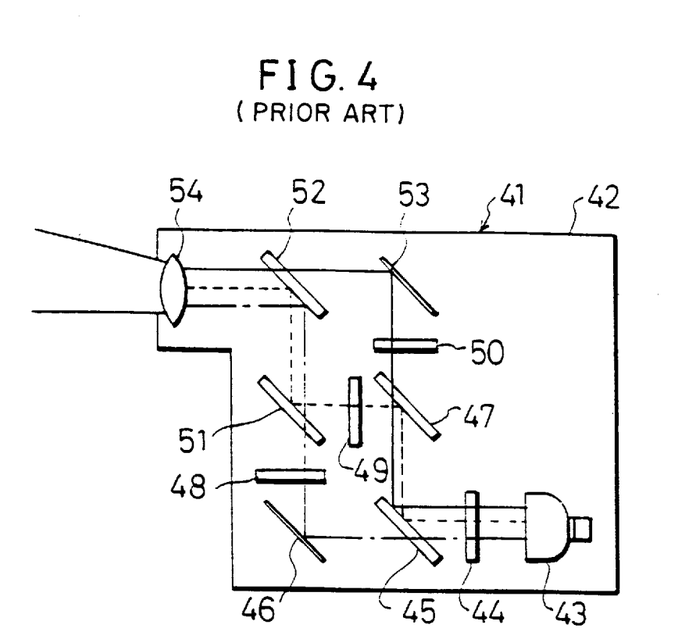
FIG. 4 is a cross sectional view showing the internal structure of a conventional projector.

FIG. 4 shows the internal structure of a housing 42 of a full color projector 41 employing the liquid crystal displays as the light bulbs. More precisely, light emanated from a light source 43 passes through an ultraviolet/infrared ray cut filter 44, and the outgoing visible ray goes into a dichroic mirror 45 which reflects red and blue and transmits green. Thus, only green light passes through the dichroic mirror 45. Subsequently, the outgoing light is reflected by a mirror 46 and further goes into a green-use liquid crystal display 48. On the other hand, light reflected by the dichroic mirror 45 goes into a dichroic mirror 47 which reflects blue and transmits red. Thus, only blue light is reflected by the dichroic mirror 47 and goes into a blue-use liquid crystal display 49 while red light passes through the dichroic mirror 47 and goes into a red-use liquid crystal display 50.

Incident light to the green-use liquid crystal display 48 passes through the same first and thence a dichroic mirror 51 which reflects blue and transmits green. Subsequently, the outgoing light is reflected by a dichroic mirror 52 which reflects blue and green and transmits red, and goes into a projecting lens 54. Incident light to the blue-use liquid crystal display 49 passes through the same. Subsequently, the outgoing light is reflected sequentially by the dichroic mirrors 51•52 and goes into the projecting lens 54. Incident light to the red-use liquid crystal display 50 passes through the same. Subsequently, the outgoing light is reflected by a mirror 53 and goes into the projecting lens 54 through the dichroic mirror 52. Accordingly, the light separated into three colors are synthesized and projected on an unillustrated screen through the projecting lens 54.

The light passing through the green-use liquid crystal display 48 and the one passing through the red-use liquid crystal display 50 are reflected only once by the dichroic mirror 52 and mirror 53, respectively. Thus, the images formed by the liquid crystal displays 48•50 are in the same orientation. Whereas the light passing through the blue-use liquid crystal display 49 is reflected twice by the dichroic mirrors 51•52. Thus, the image formed by the blue-use liquid crystal display 49 must be reversed left to right with respect to the other two images formed by the liquid crystal displays 48•50. This means that a single projector must include a plurality of liquid crystal displays of two types: one forms an image reversed left to right with respect to an image formed by the other.

Figure 5:
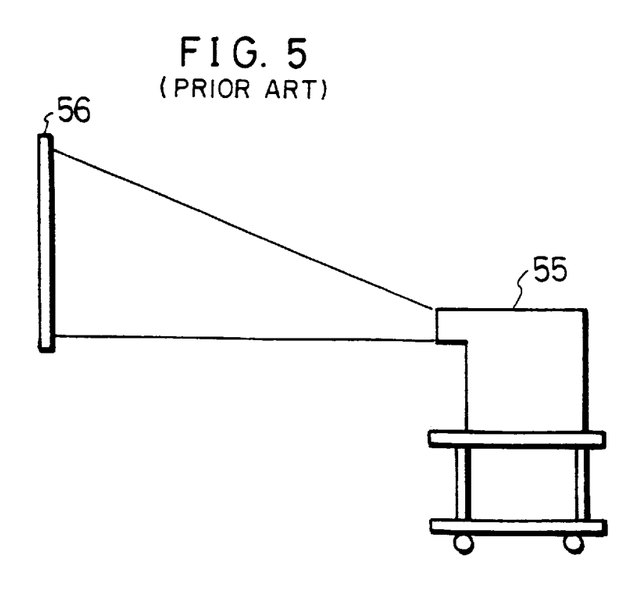
FIG. 5 is a view explaining a floor-setting type front projector.
Figure 6:
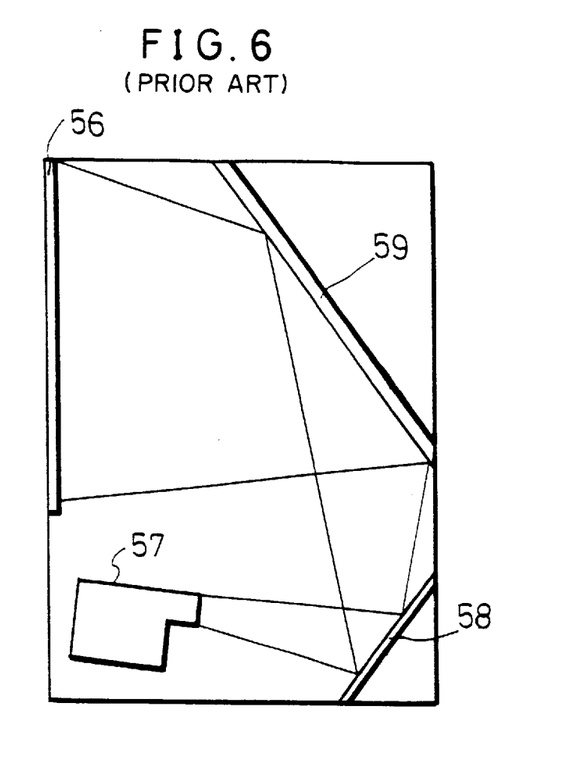
FIG. 6 is a view explaining a rear projector.

In addition, the projectors are classified into a front projector as shown in FIG. 5 and a rear projector as shown in FIG. 6. A projector 55 representing the former projects an image on a screen 56 from the front side thereof, while a projector 57 representing the latter projects an image on the screen 56 from the rear side thereof by way of reflecting mirrors 58•59. Note that the images projected respectively by the projector 55 and 57 are reversed left to right with respect to each other.

Figure 7:
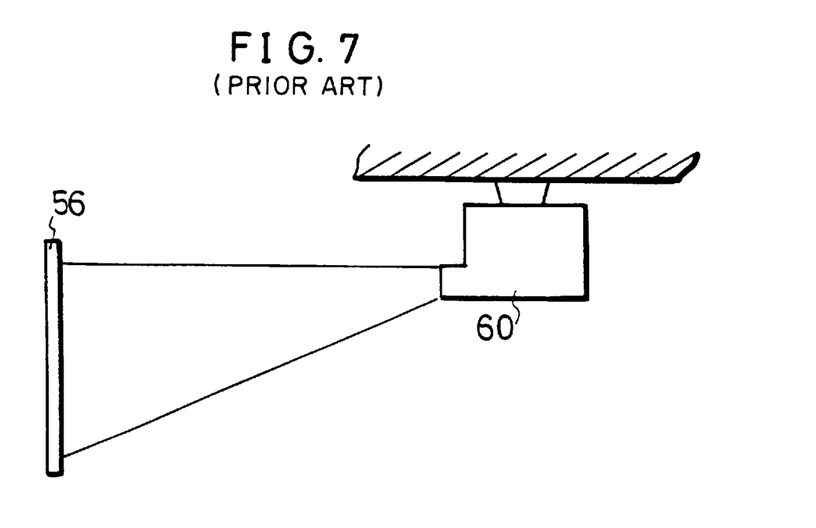
FIG. 7 is a view explaining a pendant type front projector.

Further, the front projector includes a floor-setting type such as the projector 55 shown in FIG. 5 and a pendant type projector 60 as shown in FIG. 7, and note that the images projected respectively by the projectors 55 and 60 are reversed left to right and upside down with respect to each other.

This means an image formed by each liquid crystal display in the projector must be reversed left to right and/or upside down in accordance with the usage pattern of the projector.

The image is reversed left to right only by reversing the direction in which image signals are sequentially supplied to pixels. To be more specific, the image is reversed left to right by providing a shifting driver as a signal line driver and switching the shifting direction thereof. For example, Japanese Laid-open Patent Application No. 3-289697/1991 discloses a driver on-board type liquid crystal panel which is a unit comprising a plurality of signal line drivers each having their respective shifting directions.

Figure 8:
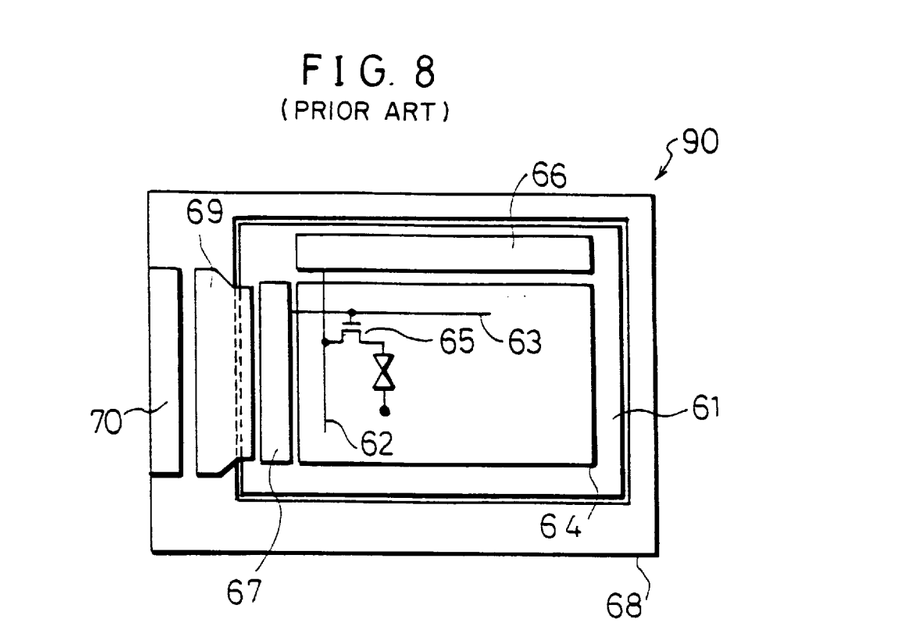
FIG. 8 is a view depicting the structure of a liquid crystal display employing a conventional driver on-board liquid crystal panel.

FIG. 8 shows a liquid crystal display 90, which is a typical liquid crystal display used as the green-, blue-, and red-use liquid crystal displays 48•49•50. The liquid crystal display 90 comprises a driver on-board type liquid crystal panel 61 which is a unit comprising signal lines 62 and scanning lines 63, transistors 65 of a viewing portion 64, an X driver 66 driving the signal lines 62, and a Y driver 67 driving the scanning lines 63. The liquid crystal panel 61 is placed on a PCB (printed circuit board) 68 having an opening in a matching position with the viewing portion 64, and electrically connected to the PCB 68 by means of an FPC (flexible printed circuit) 69, whereby the liquid crystal panel 61 is electrically connected to a signal input unit 70 provided at one end of the liquid crystal display 90 through the wiring on the PCB 68 and driven by an input signal from the signal input unit 70.

Figure 9:
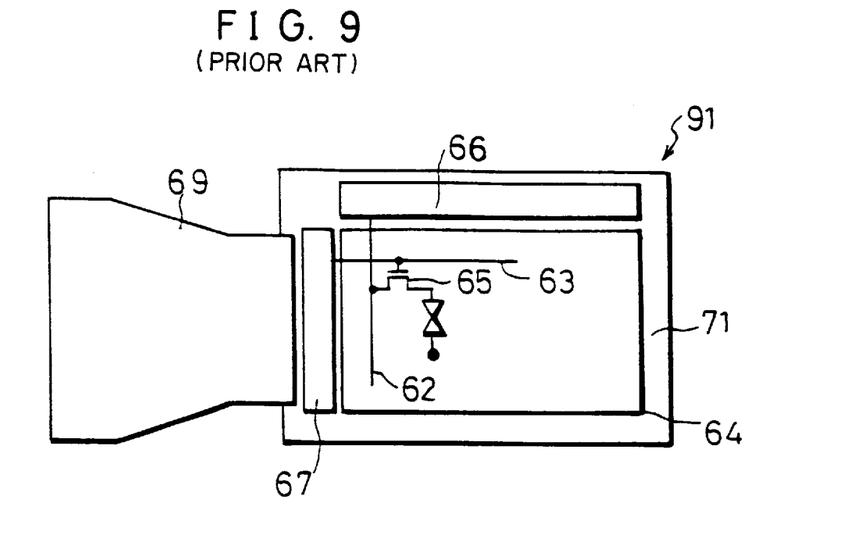
FIG. 9 is another view depicting the structure of a liquid crystal display employing a conventional driver on-board liquid crystal panel.
Figure 10:
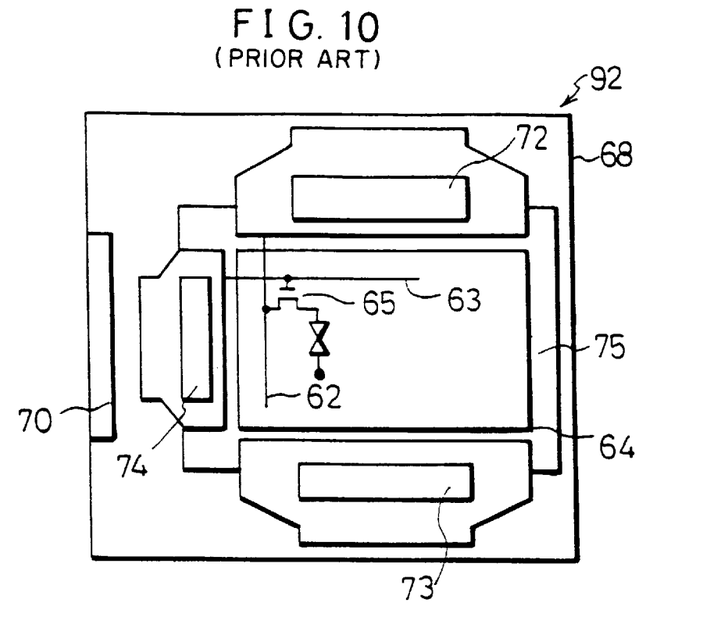
FIG. 10 is a view depicting the structure of a liquid crystal display employing a conventional liquid crystal panel whose drivers are connected to external devices.

Alternately, liquid crystal displays 91•92 respectively shown in FIGS. 9 and 10 may be used. The like components are labelled with like numerals with respect to FIG. 8 and the explanation of the same is omitted herein for the explanation's convenience. The liquid crystal display 91 shown in FIG. 9 includes a driver•wiring on-board type liquid crystal panel 71 in which the wiring is formed on the substrate besides the X driver 66 and Y driver 67. The liquid crystal display 92 shown in FIG. 10 includes an external connected type liquid crystal panel 75 whose X drivers 72•73 and a Y driver 74 are connected to external devices. The liquid crystal display 92 can change the shifting direction of the X driver by making the shifting directions of the X drivers 72•73 reverse with respect to each other and switching between the same.

Incidentally, the characteristics of the green-, blue-, red-use liquid crystal displays 48•49•50 used as the light bulbs of the projector 41 shown in FIG. 4 deteriorate when the transistors of the viewing portion are irradiated, thereby degrading the contrast. To eliminate this problem, the green-, blue-, red-use liquid crystal displays 48•49•50 must be installed within the housing 42 in such a manner that light goes into each of the same from their respective opposing substrates side only.

In addition, when the green-, blue-, red-use liquid crystal displays 48•49•50 are liquid crystal displays each including a TN (twisted nematic) liquid crystal panel whose contrast depends largely on an angle (visual angle characteristics) and the direction of a visual angle (hereinafter referred to as the visual angle direction) in which the contrast reaches its maximum deviates from the direction of a normal line, the green-, blue-, red-use liquid crystal displays 48•49•50 must be installed within the housing 42 in such a manner that the visual angle direction of each liquid crystal panel matches with the light incident direction. When the projector employs the liquid crystal displays including the liquid crystal panels with strong visual angle characteristics, the upper part of the liquid crystal panel (optically equivalent position) is projected on the lower part of the screen, and because the light goes into the liquid crystal display from the opposing substrate side herein, the lower part of the screen renders high contrast only when the incident direction (visual angle direction) of high-contrast light is downward from the opposing substrate side to a TFT substrate. For this reason, unless the visual angle directions of the green-, blue-, red-use liquid crystal displays 48•49•50 match with the light incident directions in their respective liquid crystal panels, there occurs uneven color because of the degradation of contrast and difference in the directions in which the contrast reaches its maximum, thereby degrading the image quality significantly.

In short, when the liquid crystal displays are used as the light bulbs of the projector, each liquid crystal display must be installed within the housing in such a manner that the opposing substrate of the liquid crystal panel is placed on the light incident side, and that the visual angle direction of each liquid crystal panel matches with the light incident direction.

Figure 11:
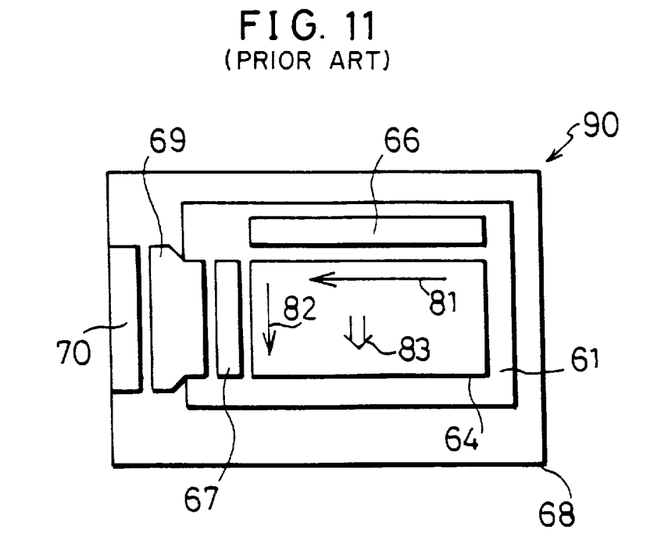
FIG. 11 is a view explaining the shifting directions of the drivers of the liquid crystal display, and the visual angle direction and signal input direction of the liquid crystal panel when the liquid crystal display is used in the projector.
Figure 12:
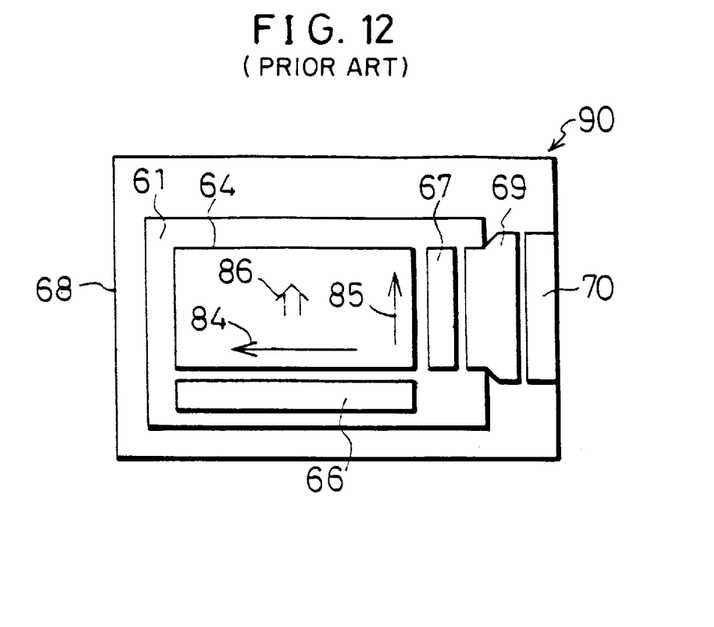
FIG. 12 is a view explaining the shifting directions of the drivers of the liquid crystal display, and the visual angle direction and signal input direction of the liquid crystal panel when the liquid crystal display is used in the projector.

Thus, when the liquid crystal displays 90 shown in FIG. 8 are used as the green-, blue-, red-use liquid crystal displays 48•49•50, they are installed within the housing in such a manner that a signal is inputted into each signal input unit 70 in a direction reversed with respect to each other, and that the shifting directions 81•84 of the X drivers 66 are reverse with respect to each other as shown in FIGS. 11 and 12. In the drawings, numerals 81•84 indicate the shifting direction of the X driver 66 seen along the light incident direction, and numerals 82•85 indicate the shifting directions of the Y driver 67 seen along the light incident direction. Also, numerals 83•86 indicate that the visual angle directions of the liquid crystal panel 61 from the opposing substrate side to the TFT substrate side are downward and upward, respectively.

To be more specific, the red-, and green-use liquid crystal displays 48•50 are installed within the housing 42 as shown in FIG. 4 in such a manner that the shifting directions and visual angle directions of the X driver 66 and Y driver 67 seen along the light incident direction are arranged as shown in FIG. 11 and that each signal input unit 70 is positioned outward in a direction perpendicular to the drawing. On the other hand, the blue-use liquid crystal display 49 is installed within the housing 42 as shown in FIG. 4 in such a manner that the shifting directions and visual angle directions of the X driver 66 and Y driver 67 seen along the light incident direction are arranged as shown in FIG. 12 and that the signal input unit 70 is positioned inward in the direction perpendicular to the drawing.

In this case, a shift register is provided to enable the X driver 66 to change the shifting direction. As a result, the blue-use liquid crystal display 49, which forms an image reversed left to right with respect to those formed by the green- and red-use liquid crystal displays 48•50, can share the liquid crystal displays 90 of one type with the green- and red-use liquid crystal displays 48•50. However, the signal input units 70 of the red- and green-use liquid crystal displays 48•50 and the signal input unit 70 of the blue-use liquid crystal display 49 are placed in an opposite position (outward and inward in the direction perpendicular to FIG. 4). In order to input a signal to the signal input unit 70 placed at the opposite end, either the signal input units 70 must be connected by an extended wiring for register signal input or a circuit board must be additionally provided at the opposite end. Extending the signal line presents a problem that the display quality is degraded by noises or the like, while providing another circuit board presents a problem that the projector becomes undesirably large by an extra space for the additional circuit board, and that a cooling mechanism for the liquid crystal panel 61 becomes complicated. Thus, the benefits realized by sharing the liquid crystal displays 90 of one type are canceled out. Note that the same problems occur when the front projector shown in FIG. 5 and the rear projector shown in FIG. 6 share the liquid crystal displays serving as the light bulbs.

Figure 13:
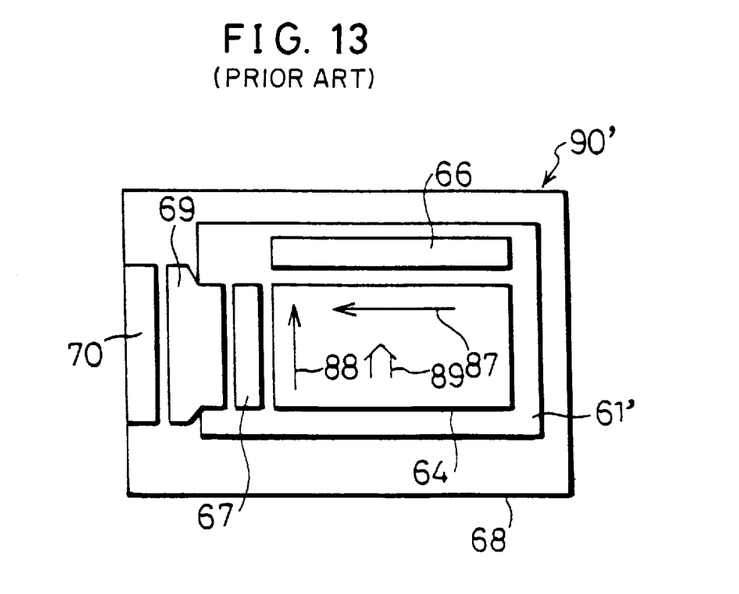
FIG. 13 is a view explaining the shifting directions of the drivers of the liquid crystal display, and the visual angle direction and signal input direction of the liquid crystal panel when the liquid crystal display is used in the projector.

The problems of degrading the display quality and upsizing the projector may be eliminated when the liquid crystal displays are installed within the housing in such a manner that all the signal input units 70 are placed on the same side. However, in this case, the shifting directions 82•88 of the Y driver 67 and the visual angle direction 83•89 of the liquid crystal panel 61 must be reversed with respect to each other as shown in FIGS. 11 and 13. Although the shifting direction of the Y driver 67 can be changed relatively easy by providing a shift register which can change the shifting directions, the visual angle direction of the liquid crystal panel 61 can not be changed arbitrary. Thus, the liquid crystal display demands another liquid crystal panel 61' having a different visual angle direction. This means that the projector demands another liquid crystal display 90' in addition to the liquid crystal displays 90, thereby making it impossible for the projector to use the liquid crystal displays of one type in common. Thus, the resulting projector comprises more components and becomes expensive. In the drawing, numerals 81•87 denote the shifting directions of the shift register of the X driver 66.

Figure 14:
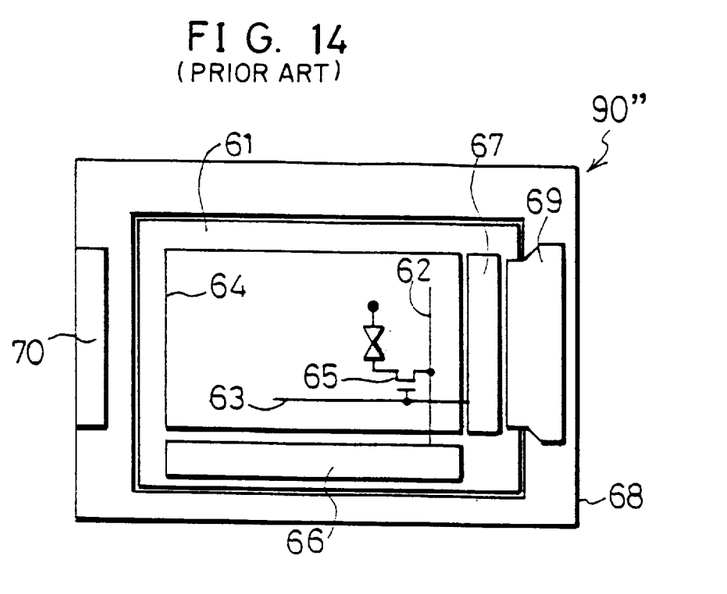
FIG. 14 is a view depicting the structure of the liquid crystal display shown in FIG. 8 when the position of the signal input unit is changed.
Figure 15:
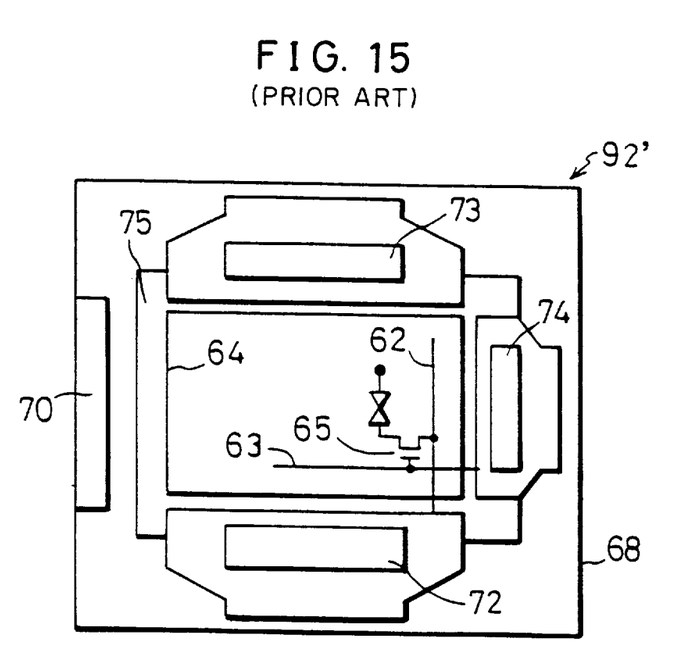
FIG. 15 is a view depicting the structure of the liquid crystal display shown in FIG. 10 when the position of the signal input unit is changed.

Note that the above problems occur also when the projector employs liquid crystal displays 90"•92' shown in FIGS. 14 and 15, whose signal input units 70 are placed at the opposite ends to those of the liquid crystal displays 90•92 shown in FIGS. 8 and 10, respectively, because the projector comprises more components.

SUMMARY OF THE INVENTION

It is therefore the object of the present invention to provide, when a liquid crystal display is used as a light bulb of a projector by permitting the light enter into the liquid crystal panel thereof from the opposing substrate side only and matching the visual angle direction of the liquid crystal panel with the light incident direction, (1) a liquid crystal display used in common when each liquid crystal display must form an image reversed left to right with respect to each other; and (2) a liquid crystal display used in common when each liquid crystal display must form an image reversed left to right and upside down with respect to each other, so that a downsized, light, and inexpensive projector with high-quality displays can be realized without degrading the display quality, upsizing the projector, increasing the weight, and complicating the cooling mechanism.

To fulfill the above object, the liquid crystal display of the present invention comprises:

a liquid crystal panel having a plurality of scanning lines and a plurality of signal lines crossing each other at right angles, and visual angle characteristics that a direction of a visual angle in which contrast reaches its maximum does not match with a direction of a normal line;

scanning line driving means for applying a selecting signal to said plurality of scanning lines regularly;

signal line driving means for applying an image signal to said plurality of signal lines in sync with said selecting signal;
   image's sides reversing means for reversing an order of said image signal application to said plurality of signal lines by said signal line driving means;
signal input units for inputting a signal to said liquid crystal display from an external device, said signal input units being formed at two opposing ends of said liquid crystal display; and
mounting means for fixedly mounting said liquid crystal display to another device, said mounting means being formed point symmetry with respect to a center of a viewing portion of said liquid crystal panel.

According to the above structure, the visual angle direction in which the contrast reaches its maximum does not match with the direction of the normal line. Thus, to yield good contrast when light passing through the liquid crystal panel is used for some purpose, the liquid crystal panel is positioned to a specific angle with respect to the light incident direction. With a liquid crystal panel reaching its maximum contrast when the visual angle direction matches with the direction of the normal line, there occurs no problem whether the panel surface of each liquid crystal panel is reversed upside down (left to right) with respect to an adequate positioning angle as long as the normal line of the liquid crystal panel matches with the light incident direction. However, in case of the above-structured liquid crystal panel, the contrast of transmitted light degrades when the panel surface is reversed upside down (left to right) with respect to an adequate positioning angle. Thus, the above-structured liquid crystal panel must be installed at an adequate angle with respect to the incident light.

Accordingly, in the above structure, the mounting means for fixedly mounting the liquid crystal display to another device is formed point symmetry with resect to the center of the viewing portion of the liquid crystal panel. Thus, when the liquid crystal displays are mounted to another device, their respective panel surfaces of the liquid crystal panels are rotated by 180° around the center of the viewing portion thereof with respect to each other: that is, the panel surfaces are reversed upside down (left to right) with respect to each other. Each liquid crystal display is fixed to a specific position in a direction reversed with respect to each other in accordance with the light incident direction at the specific position. Thus, if a projector including a plurality of liquid crystal displays is assembled, there is no need to prepare several types of liquid crystal displays each having different incident angles. The projector can be assembled with a plurality of liquid crystal displays of one type. In addition, the projector can yield maximum contrast using the transmitted light.

Further, according to the above structure, the signal input units are formed at two opposing ends of each liquid crystal display. Thus, when a plurality of the above-structured liquid crystal displays are installed in another device, only the signal input units on either end needs the wiring, thereby simplifying the wiring. Accordingly, the device including the above-structured liquid crystal displays can be downsized because such a simple wiring does not complicate the circuit board and cooling mechanism.

Also, to fulfill the above object, the projector of the present invention comprises:
   a white light source;
   spectroscopic means for separating white light from said white light source into monochromatic rays;
   a plurality of liquid crystal devices for respectively transmitting said monochromatic rays while modulating the same using image signals corresponding to their respective colors;
   projecting means for projecting all of said monochromatic rays having passed through their respective liquid crystal displays by synthesizing the same; and
   ray directing means for directing said monochromatic rays having passed through said liquid crystal displays to said projecting means, wherein
each of said liquid crystal displays comprises:
   (1) a liquid crystal panel having a substrate including a plurality of scanning lines and a plurality of signal lines crossing each other at right angles, and visual angle characteristics that a direction of a visual angle in which contrast reaches its maximum does not match with a direction of a normal line;
   (2) scanning line driving means for applying a selecting signal to said plurality of scanning lines regularly;
   (3) signal line driving means for applying an image signal to said plurality of signal lines in sync with said selecting signal;
   (4) signal input units, formed at two opposing ends of said liquid crystal display, for inputting a signal to said liquid crystal display from an external device;
   (5) image's sides reversing means for reversing an order of said image signal application to said plurality of signal lines by said signal line driving means; and
   (6) mounting means, formed to be point symmetry with respect to a center of a viewing portion of said liquid crystal panel, for fixedly mounting said liquid crystal display to another device.

According to the above structure, the image's sides reversing means reverses the order of image signal application to the signal lines by the signal line driving means, so that an image reversed left to right is displayed on the liquid crystal panel. In addition, each liquid crystal display has the signal input units at two opposing ends, and the mounting means for fixedly mounting the liquid crystal display to the projector is formed point symmetry with respect to the center of the viewing portion of the liquid crystal panel. As a result, when the projector changes the usage pattern and each liquid crystal display must reverse a display image left to right, the projector does not demand the liquid crystal displays of different types, and can be comprised the liquid crystal displays of one type, thereby making it possible to save the manufacturing costs.

In case of a projector using the liquid crystal device further comprising the image's top and bottom reversing means for reversing the order of the selection signal application to the scanning lines by the scanning line driving means, the image can be reversed not only left to right but also upside down when the image's top and bottom reversing means reverses the order of the selection signal application to the scanning lines by the scanning line driving means. As a result, the front projector (floor-setting type and pendant type) and rear projector can share the liquid crystal displays, thereby making these projectors smaller, lighter, and less expensive.

For a fuller understanding of the nature and advantages of the invention, reference should be made to the ensuing detailed description taken in conjunction with the accompanying drawings.

DESCRIPTION OF THE EMBODIMENT

Embodiments of the present invention will be explained in the following while referring to FIGS. 1(a) through 3.

Figure 2:
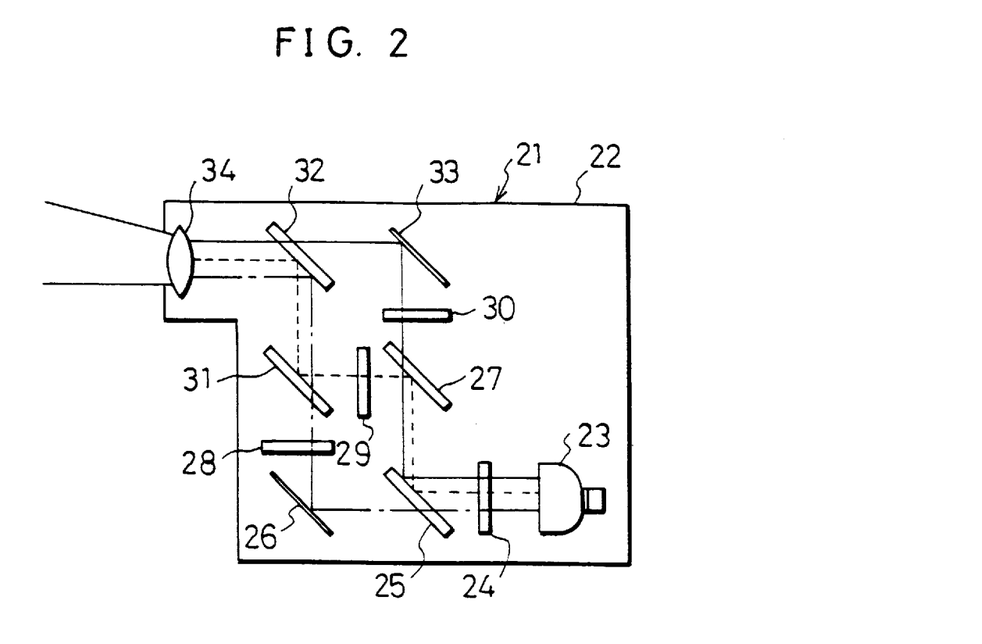
FIG. 2 is a cross sectional view showing the internal structure of a projector.

FIG. 2 shows the internal structure of a housing 22 of a full color projector 21 in accordance with the embodiment. More precisely, light emanated from a light source 23 goes into an ultraviolet/infrared ray cut filter 24, and the outgoing visible ray goes into a dichroic mirror 25 which reflects red and blue and transmits green. Thus, only green light passes through the same. Subsequently, the outgoing light is reflected by a mirror 26 and further goes into a green-use liquid crystal display 28. On the other hand, the light reflected by the dichroic mirror 25 goes into a dichroic mirror 27 which reflects blue and transmits red. Then, blue light is reflected by the dichroic mirror 27 and goes into a blue-use liquid crystal display 29 while red light passes through the dichroic mirror 27 and goes into a red-use liquid crystal display 30.

Incident light to the green-use liquid crystal display 28 passes through the same first and thence a dichroic mirror 31 which reflects blue and transmits green. Subsequently, the outgoing light is reflected by a dichroic mirror 32 which reflects blue and green and transmits red, and further goes into a projecting lens 34. Incident light to the blue-use liquid crystal display 29 passes through the same. Subsequently, the outgoing light is reflected by dichroic mirrors 31•32 sequentially, and further goes into the projecting lens 34. Incident light to the red-use liquid crystal display 30 passes through the same. Subsequently, the outgoing light is reflected by a mirror 33, passes through the dichroic mirror 32 and goes into the projecting lens 34. Accordingly, the light separated into three colors are synthesized and projected on an unillustrated screen through the projecting lens 34.

Figure 1A:
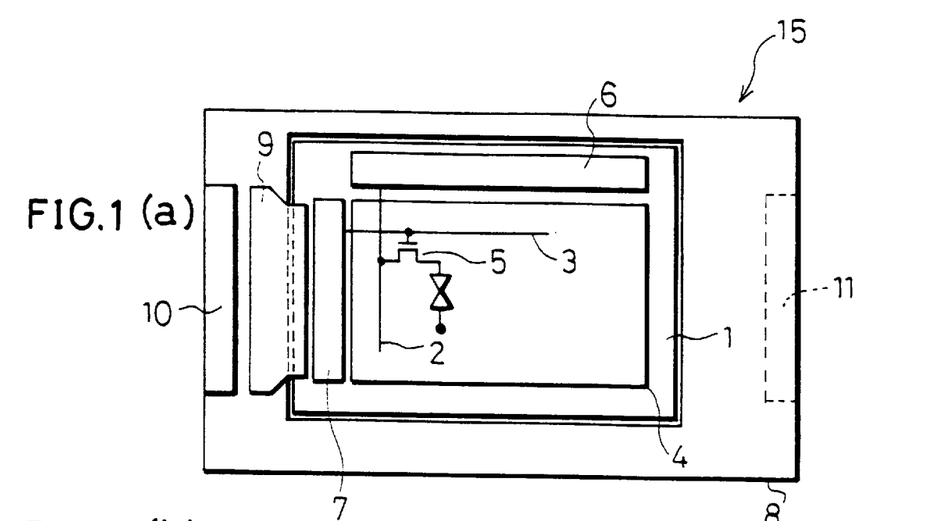
FIGS. 1(a) and 1(b) are views depicting the structure of a liquid crystal display employing a driver on-board liquid crystal panel in accordance with an embodiment of the present invention.
Figure 1B:
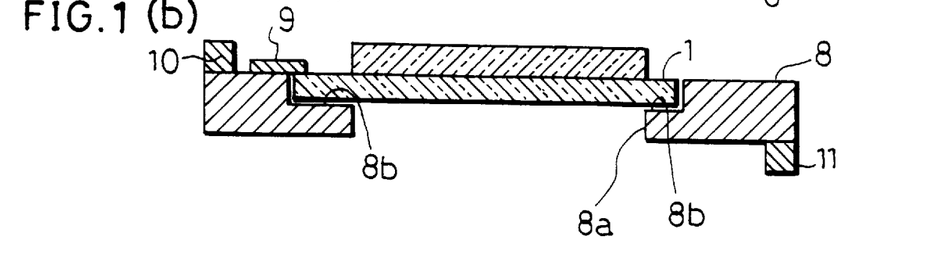

As shown in FIGS 1(a) and 1(b), a liquid crystal display 15 used as the green-, blue-, and red-use liquid crystal displays 28•29•30 includes a liquid crystal panel 1 using a TN (twist nematic) liquid crystal which is twisted more than 90°. The liquid crystal panel 1 is of an active matrix type with an on-board driver. More precisely, the liquid crystal panel 1 is a unit comprising signal lines 2, scanning lines 3, transistors 5 of a viewing portion 4, an X driver 6 serving as a signal line driver for driving the signal lines 2, and a Y driver 7 serving as a scanning line driver for driving the scanning lines 3. The shifting direction of the X driver 6 and Y driver 7 can be changed to an arbitral direction by a signal inputted from external devices.

The liquid crystal panel 1 is placed on a PCB (printed circuit board) 8 which has an opening 8a at the center, on which the viewing portion 4 of the liquid crystal panel 1 maps when the liquid crystal panel 1 is placed thereon. The PCB 8 has a gap 8b at a lower-lying portion thereof to support the outer circumference of the liquid crystal panel 1 when the liquid crystal panel 1 is placed thereon.

The viewing portion 4 of the liquid crystal panel 1 placed on the PCB 8 in a position such that it becomes vertically and horizontally symmetric (rotation symmetric) with respect to the PCB 8, and an unillustrated mounting member of the liquid crystal display or an unillustrated position determining member.

To drive the liquid crystal panel 1 by an input signal, the liquid crystal panel 1 and PCB 8 are electrically connected by means of an FPC (flexible printed circuit) 9, whereby the liquid crystal panel 1 is electrically connected to signal input units 10•11 provided respectively on the front and rear surfaces of the PCB 8 through the wiring formed on the PCB 8.

The above-structured liquid crystal displays 15 are installed within the housing 22 as the green-, blue-, and red-use liquid crystal displays 28•29•30 in such a manner that each opposing substrate is placed on the light incident side, and that the visual angle direction matches with the light incident direction for the reasons previously explained.

Although the liquid crystal displays 15 of one type are commonly used as the green-, blue-, and red-use liquid crystal displays 28•29•30, the blue-use liquid crystal display 29 can form an image reversed left to right with respect to those formed by the green-use liquid crystal display 28 and red-use liquid crystal display 30 by reversing the shifting direction of the X driver 6 of the liquid crystal display 15 serving as the blue-use liquid crystal display 29 with respect to the others. In addition, the signal input direction of the liquid crystal display 15 serving as the blue-use liquid crystal display 29 is opposite with respect to those of the liquid crystal displays 15 severing as the green- and red-use liquid crystal displays 28•30. However, since the signal input units 10•11 are provided respectively at the left and right ends thereof, signals can be inputted into the green-, blue-, and red-use liquid crystal displays 28·29·30 in the same direction using the input unit 11 for the blue-use liquid crystal display 29 and the input unit 10 for the green- and red-use liquid crystal displays 28·30. Thus the projector can use the liquid crystal displays 15 in common without degrading display quality, upsizing the projector, increasing the weight, and complicating the cooling mechanism as has been used to even when the images formed by the liquid crystal displays must be reverse left to right with respect to each other. Also, the front projector 55 shown in FIG. 5 and rear projector 57 shown in FIG. 6 can share the liquid crystal displays 15 serving as the light bulbs.

In case of the above-mentioned liquid crystal display 15, not only the shifting direction of the X driver 6, but also that of the Y driver 7 can be reversed. Thus, the floor-setting front projector 55 in FIG. 5 and pendant type front projector 60 in FIG. 7, whose projected images are reverse left to right and the upside down with respect each other, can share the liquid crystal displays 15 of one type without degrading display quality, upsizing the projector, increasing the weight, and complicating the cooling mechanism.

Further, in case of the liquid crystal display 15, the viewing portion 4 of the liquid crystal panel 1 is rotation symmetric with respect to the mounting member of the liquid crystal display or position determining member. Thus, the liquid crystal displays of one type can be used in common whether they are installed in the same orientation or the orientation reversed with respect to each other (when the viewing portion 4 is not rotation symmetric with respect to the mounting member, the projector demands another type of liquid crystal display). As a result, the liquid crystal displays can be mounted to the projector in their respective orientations easily, thereby enhancing the assembling efficiency and hence further saving the manufacturing costs.

The present invention is not limited to the above-described structure. To be more specific, the methods of electrically connecting the liquid crystal panel 1 and PCB 8 and inputting the signal are not limited to those shown in FIG. 1, and the signal input units 10·11 may be placed on either surface of the liquid crystal panel 1 as long as they are provided at two opposing ends, respectively. Also, the PCB 8 may be of any shape as long as the viewing portion of the liquid crystal panel transmits light. Also, the liquid crystal panel is not limited to the active matrix type.

For example, in case of the liquid crystal display 15, the PCB 8 and liquid crystal panel 1 are connected electrically by means of the FPC 9 to input the signal to drive the liquid crystal display in the above embodiment; however, they may be connected electrically by the wire bonding or the like.

Also, the liquid crystal panel 1 used in the liquid crystal display 15 is of a driver on-board type in which the X and Y drivers 6·7 are provided on the substrate. However, the present invention is not limited to this structure. For example, a liquid crystal display 16 shown in FIG. 3 will do instated of the liquid crystal display 15. The liquid crystal display 16 is of the same structure as the liquid crystal display 15 except that it comprises a liquid crystal panel 1' of an external connected type, in which X drivers 12·13 and a Y driver 14 are connected to external devices.

Figure 3:
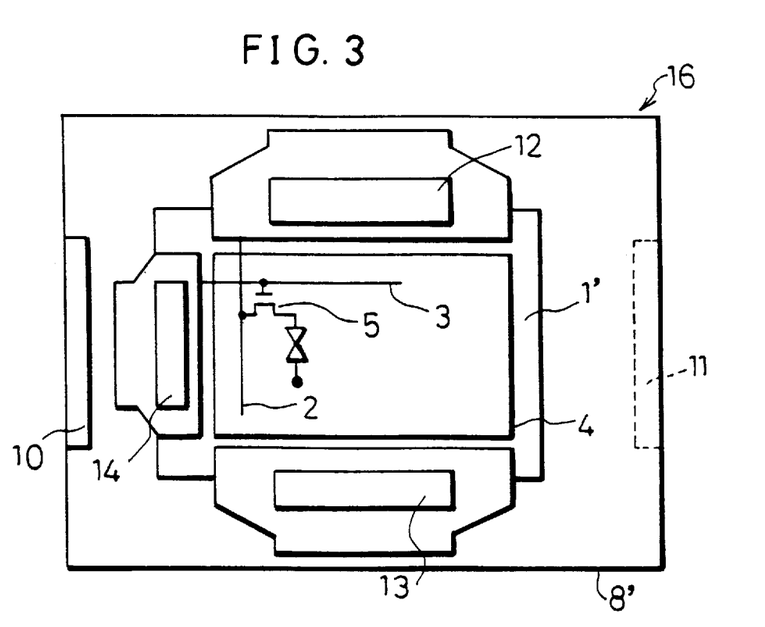
FIG. 3 is a view depicting the structure of another liquid crystal display employing a liquid crystal panel whose drivers are connected to external devices of the present invention.

Alternately, either the X drivers 12·13 or Y driver 14 may be connected to an external device and the other is provided on the substrate in the liquid crystal display 16.

As has been explained, the liquid crystal displays 15 and 16 of the present embodiment can change the shifting directions of the X driver and Y driver arbitrary, and has the signal input units 10·11 driving the liquid crystal panel at the two opposing ends, respectively. Therefore, employing the liquid crystal display 15 or 16 thus structured can eliminate the problems caused by the conventional projector having a plurality of liquid crystal displays.

To be more specific, the liquid crystal displays 90 shown in FIG. 8 must be installed in the housing in such a manner that the shifting direction of each X driver (signal line driver) 66 and the position of each signal input unit 70 are reverse with respect to each other as shown in FIGS. 11 and 12. Thus, either the wiring of the register signal input is extended or the circuit board is additionally provided at the opposite end to input a signal therefrom. This causes problems such as degrading the display quality due to noises, or upsizing the projector due to an extra space for the additional circuit board, and complicating the cooling mechanism of the liquid crystal panel. However, since the signal input unit is additionally formed at the opposite end in this embodiment, using the signal input units at the both sides selectively makes it possible to input the signals into each liquid crystal display in the same direction even when an input signal to one liquid crystal display has a reversed shifting direction (the input direction of one liquid crystal display is reversed to those of the other two liquid crystal displays). Accordingly, when the images formed by the liquid crystal displays must be reversed left to right with respect to each other, the projector can use the liquid crystal displays of one type in common without degrading display quality, upsizing the projector, increasing weight, complicating the cooling mechanism. In short, a full color projector can use the liquid crystal displays of one type in common as the light bulbs without causing any inconvenience. Also, the front projector and rear projector can share the liquid crystal displays of one type. Thus, the front projector (floor-setting type and pendant type) and rear projector can share the liquid crystal displays of one type serving as the red, green, and blue light bulbs, thereby enabling a high-quality, downsized, light, and inexpensive projector.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A liquid crystal display comprising:
    a liquid crystal panel having a plurality of scanning lines and a plurality of signal lines crossing each other at right angles, and visual angle characteristics that a direction of a visual angle in which contract reaches its maximum does not match with a direction of a normal line;
    scanning line driving means for applying a selecting signal to said plurality of scanning lines regularly;
    signal line driving means for applying an image signal to said plurality of signal lines in sync with said selecting signal;
    image's sides reversing means for reversing an order of said image signal application to said plurality of signal lines by said signal line driving means;
    signal input units, for inputting a signal to said liquid crystal display from an external device, said signal input units being formed at two opposing ends of said liquid crystal display; and
    mounting means for fixedly mounting said liquid crystal display to another device, said mounting means being formed point symmetry with respect to a center of a viewing portion of said liquid crystal panel and said mounting means being an outermost frame of said liquid crystal display.

2. The liquid crystal display as defined in claim 1, wherein said image's sides reversing means includes a shift register which can switch shifting directions.

3. A liquid crystal display comprising:
a liquid crystal panel having a plurality of scanning lines and plurality of signal lines crossing each other at right angles, and visual angle characteristics that a direction of a visual angle in which contrast reaches its maximum does not match with a direction of a normal line;
scanning line driving means for applying a selecting signal to said plurality of scanning lines regularly;
signal line driving means for applying an image signal to said plurality of signal lines in sync with said selecting signal;
image's top and bottom reversing means for reversing an order of said selecting signal application to said plurality of scanning lines by said scanning line driving means;
image's sides reversing means for reversing an order of said image signal application to said plurality of signal lines by said signal line driving means;
signal input units, for inputting a signal to said liquid crystal display from an external device, said signal input units being formed at two opposing ends of said liquid crystal display; and
mounting means for fixedly mounting said crystal display to another device, said mounting means being formed point symmetry with respect to a center of a viewing portion of said liquid crystal panel and said mounting means being an outermost frame of said liquid crystal display.

4. The liquid crystal display as defined in claim 3, wherein said image's sides reversing means includes a shift register which can switch shifting directions.

5. The liquid crystal display as defined in claim 3, wherein said image's top and bottom reversing means includes a shift register which can switch shifting directions.

6. A liquid crystal display comprising:
a liquid crystal panel having a plurality of scanning lines and a plurality of signal lines crossing each other at right angles, and visual angle characteristics that a direction of a visual angle in which contrast reaches its maximum does not match with a direction of a normal line;
scanning line driving means for applying a selecting signal to said plurality of scanning lines regularly;
first signal line driving means for applying an image signal to said plurality of signal lines in sync with said selecting signal in a first direction;
second signal line driving means for applying an image signal to said plurality of signal lines in sync with said selecting signal in a second direction reversed to said first direction;
signal input units, formed at two opposing ends of said liquid crystal display, for inputting a signal from an external device;
selecting means for selecting one of said first and second signal line driving means to drive said plurality of signal lines; and
mounting means for fixedly mounting said liquid crystal display to another device, said mounting means being formed point symmetry with respect to a center of a viewing portion of said liquid crystal panel and said mounting means being an outermost frame of said liquid crystal display.

7. A projector comprising:
a white light source;
spectroscopic means for separating white light from said white light source into monochromatic rays;
a plurality of liquid crystal devices for respectively transmitting said monochromatic rays while modulating the same using image signals corresponding to their respective colors;
projecting means for projecting all of said monochromatic rays having passed through their respective liquid crystal displays by synthesizing the same;
ray directing means for directing said monochromatic rays having passed through said liquid crystal displays to said projecting means; and
wherein each of said liquid crystal displays comprises:
(1) a liquid crystal panel having a substrate including a plurality of scanning lines and a plurality of signal lines crossing each other at right angles, and visual angle characteristics that a direction of a visual angle in which contrast reaches its maximum does not match with a direction of a normal line;
(2) scanning line driving means for applying a selecting signal to said plurality of scanning lines regularly;
(3) signal line driving means for applying an image signal to said plurality of signal lines in sync with said selecting signal;
(4) signal input units, formed at two opposing ends of said liquid crystal display, for inputting a signal to said liquid crystal display from an external device;
(5) image's sides reversing means for reversing an order of said image signal application to said plurality of signal lines by signal line driving means; and
(6) mounting means, formed to be point symmetry with respect to a center of a viewing portion of said liquid crystal panel, for fixedly mounting said liquid crystal display to another device, said mounting means being an outermost frame of said liquid crystal display.

8. The projector as defined in claim 7, wherein each of said liquid crystal displays further comprises image's top and bottom reversing means for reversing an order of said selecting signal application to said plurality of scanning lines by said scanning line driving means.

9. The projector as defined in claim 7 further comprises position determining means for determining a position of each of said liquid crystal displays within said projector, wherein
said mounting means of each liquid crystal display is linked with said position determining means in such a manner that light enters into each liquid crystal display from a side of an opposing substrate opposing said substrate, and that said incident light passes through each liquid crystal display in a direction in which contrast reaches its maximum.

10. A projector comprising:
a white light source;
spectroscopic means for separating white light from said white light source into monochromatic rays;
a plurality of liquid crystal devices for respectively transmitting said monochromatic rays while modulating the same using image signals corresponding to their respective colors;

projecting means for projecting all of said monochromatic rays having passed through their respective liquid crystal displays by synthesizing the same;

ray directing means for directing said monochromatic rays having passed through said liquid crystal displays to said projecting means; and wherein each of said liquid crystal displays comprises:

(1) a liquid crystal panel having a substrate including a plurality of scanning lines and plurality of signal lines crossing each other at right angles, and visual angle characteristics that a direction of a visual angle in which contrast reaches its maximum does not match with a direction of a normal line;

(2) scanning line driving means for applying a selecting signal to said plurality of scanning lines regularly;

(3) signal line driving means for applying an image signal to said plurality of signal lines in sync with said selecting signal;

(4) signal input units, formed at two opposing ends of said liquid crystal display, for inputting a signal to said liquid crystal display from an external device;

(5) image side's reversing means for reversing an order of said image signal application to said plurality of said signal lines depending whether each monochromatic ray passing through each liquid crystal display has been reflected an even or odd number of times until said monochromatic ray reaches said projecting means through said light directing means; and (6) mounting means, formed to be point symmetry with respect to a center of a viewing portion of said liquid crystal panel, for fixedly mounting said liquid crystal display to another device, said mounting means being an outermost frame of said liquid crystal display.

11. The projector as defined in claim 10, further comprises position determining means for determining a position of each of said liquid crystal displays within said projector, wherein said mounting means of each liquid crystal display is linked with said position determining means in such a manner that light enters into each liquid crystal display from a side of an opposing substrate opposing said substrate, and that said incident light passes through each liquid crystal display in a direction in which contrast reaches its maximum.

\* \* \* \* \*